United States Patent
Feng et al.

(10) Patent No.: US 8,154,959 B2
(45) Date of Patent: Apr. 10, 2012

(54) OPTICAL STORAGE SYSTEM AND SPHERICAL ABERRATION COMPENSATION APPARATUS AND METHOD THEREOF

(75) Inventors: Wen-Chun Feng, Taipei (TW); Chien-Liang Yeh, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 671 days.

(21) Appl. No.: 12/344,227

(22) Filed: Dec. 25, 2008

(65) Prior Publication Data

US 2009/0323480 A1    Dec. 31, 2009

(30) Foreign Application Priority Data

Jun. 26, 2008   (TW) ................................ 97123976 A

(51) Int. Cl.
*G11B 7/00* (2006.01)
(52) U.S. Cl. ............... 369/44.23; 369/44.29; 369/112.01
(58) Field of Classification Search ............... 369/44.23, 369/44.29, 112.01
See application file for complete search history.

(56) References Cited

U.S. PATENT DOCUMENTS

| | | | |
|---|---|---|---|
| 6,756,574 B2 | 6/2004 | Higuchi | |
| 2002/0159342 A1* | 10/2002 | Ogasawara et al. | 369/44.23 |
| 2006/0072389 A1* | 4/2006 | Matsumoto | 369/44.25 |
| 2006/0114793 A1* | 6/2006 | Tonami | 369/112.01 |
| 2006/0233070 A1* | 10/2006 | Kurokawa et al. | 369/44.23 |
| 2007/0041287 A1 | 2/2007 | Hong et al. | |
| 2007/0237040 A1* | 10/2007 | Yamasaki et al. | 369/44.32 |
| 2008/0151701 A1* | 6/2008 | Park et al. | 369/13.53 |
| 2008/0291803 A1* | 11/2008 | Ikeda | 369/53.25 |
| 2009/0022033 A1* | 1/2009 | Raaymakers | 369/112.01 |
| 2009/0168616 A1* | 7/2009 | Chung et al. | 369/44.32 |

* cited by examiner

*Primary Examiner* — Wayne Young
*Assistant Examiner* — Brenda Bernardi
(74) *Attorney, Agent, or Firm* — Jianq Chyun IP Office

(57) ABSTRACT

An optical storage system and a spherical aberration (SA) compensation apparatus and method thereof are provided. The SA compensation apparatus includes a microprocessor and a digital-signal-processor (DSP). The microprocessor repeatedly regulates a compensation value of an SA compensation driver in the optical-pickup-head (OPH) after the microprocessor has determined the type of an optical storage medium and before the OPH has focused on the optical storage medium. The DSP processes a plurality of electrical signals converted through the OPH whenever the microprocessor has regulated the compensation value of the SA compensation driver, so as to obtain width values of a plurality of focus-error (FE) signals. Accordingly, the microprocessor makes the SA compensation driver to drive an SA compensation unit according to the width values of the FE signals, so as to compensate an SA of the light point generated by the OPH and focused on the optical storage medium.

25 Claims, 5 Drawing Sheets

OPTICAL STORAGE SYSTEM AND SPHERICAL ABERRATION COMPENSATION APPARATUS AND METHOD THEREOF

CROSS-REFERENCE TO RELATED APPLICATION

This application claims the priority benefit of Taiwan application serial no. 97123976, filed on Jun. 26, 2008. The entirety of the above-mentioned patent application is hereby incorporated by reference herein and made a part of specification.

BACKGROUND OF THE INVENTION

1. Field of the Invention

The present invention generally relates to an optical storage system, in particular, to a spherical aberration (SA) compensation apparatus and method of an optical storage system.

2. Description of Related Art

Generally speaking, in order to achieve better playback and burning quality of optical storage system, it is a critical technique of compensating a spherical aberration (SA) of a light point generated by the optical-pickup-head (OPH) and focused on the disc (e.g. compact disc, digital video disc, blue-ray disc). Currently, the spherical aberration compensation method may be substantially divided into the following three types.

1. The SA is regulated based on the amplitude of focus error (FE) signals.

2. The SA is regulated based on the amplitude of tracking error (TE) signals.

3. A photo sensor is equipped in the OPH, and provides spherical aberration error (SAE) signals to reflect the current state of the SA, and thus the SA is regulated based on the current state.

However, under the condition that the disc is not uniformly dyed, the SA is regulated based on the amplitude of the FE signals (or referred to as the S-curve), which may influence the accuracy in regulating the SA due to the great difference of the reflectivities of different regions of the disc. In addition, when the center of tracks of the disc does not coincide with the physical center of the disc, the eccentricity phenomenon may cause the changes of the included angle between the laser beams emitted by the OPH and the tracks of the disc. Therefore, not only the amplitude of the TE signals is influenced, but also the accuracy in regulating the SA is influenced. Furthermore, if the SAE is used for regulating the SA, a photo sensor must be equipped in the OPH, which may cause the increase of the cost of the OPH.

SUMMARY OF THE INVENTION

Accordingly, the present invention is directed to a spherical aberration (SA) compensation apparatus and method, which does not need the photo sensor in the optical-pickup-head (OPH), and can achieve the accurately compensate SA of the light point generated by the OPH and focused on the disc without being influenced by any factors (e.g. the difference of the reflectivities of different regions of the disc) caused by the disc.

The present invention provides an SA compensation apparatus, which includes a microprocessor and a digital signal processor (DSP). The microprocessor repeatedly regulates a compensation value of an SA compensation driver in the OPH after the microprocessor has determined the type of optical storage medium and before the OPH has focused on the optical storage medium. The DSP is coupled to the microprocessor for processing a plurality of electrical signals converted through the OPH whenever the microprocessor has regulated the compensation value of the SA compensation driver, so as to obtain width values of a plurality of focus error (FE) signals The microprocessor selects a compensation value corresponding to a smallest one of the width values of the plurality of FE signals, so as to serve as the optimal compensation value for the SA compensation driver to drive an SA compensation unit, so as to compensate the SA of the light point generated by the OPH and focused on the optical storage medium.

When the optical storage medium has data and has focused on, the microprocessor selects the appropriate SA compensation value according to ratio values of peaks and valleys of the upper envelope curves to corresponding lower envelope curves of a plurality of radio frequency (RF) signals, so as to compensate the SA of the light point generated by the OPH and focused on the optical storage medium.

When the optical storage medium does not have data and has not focused on, the microprocessor selects the appropriate SA compensation value according to peak-to-peak values of a plurality of push-pull tracking error signals, so as to compensate the SA of the light point generated by the OPH and focused on the optical storage medium.

The present invention further provides an optical storage system having the SA compensation apparatus.

The present invention still provides an SA compensation method, which includes the following steps. First, a compensation value of an SA compensation driver in the optical-pickup-head (OPH) is repeatedly regulated after the microprocessor has determined the type of the optical storage medium and before the OPH has focused on optical storage medium. Then, a plurality of electrical server signals converted through the OPH are processed whenever a compensation value of an SA compensation driver has been regulated, so as to obtain width values of a plurality of focus error FE) signals. Finally, the SA of the light point generated by the OPH and focused on the optical storage medium is compensated according to a compensation value corresponding to a smallest one of the width values of the plurality of FE signals.

In an embodiment according to the present invention, the SA compensation method further includes determining whether the optical storage medium has data stored thereon after the OPH has focused on the optical storage medium and before the OPH performs a track-pull-in operation on the optical storage medium.

When the optical storage medium has stored data and has focused on, the SA compensation method further includes the following steps. First, a compensation value of the SA compensation driver in the OPH has been repeatedly regulated once again. A plurality of electrical signals converted through the OPH are processed whenever a compensation value of the SA compensation driver has been regulated, so as to obtain ratio values of peaks and valleys of the upper envelope curves to corresponding lower envelope curves of a plurality of RF signals. Finally, the SA compensation driver is made to drive the SA compensation unit of the OPH according to a compensation value corresponding to a greatest ratio value, so as to compensate the SA of the light point generated by the OPH and focused on the optical storage medium.

When it is determined that the optical storage medium has not stored data and has focused on, the SA compensation method further includes the following steps. First, a compensation value of the SA compensation driver in the OPH is repeatedly regulated once again. Then, a plurality of electrical signals converted through the OPH are processed whenever a compensation value of the SA compensation driver is regulated, so as to obtain peak-to-peak values of a plurality of push-pull tracking error signals. Finally, according to a compensation value corresponding to the greatest one of the peak-to-peak values, the SA compensation driver is made to drive SA compensation unit of the OPH, so as to compensate the SA of the light point generated by the OPH and focused on the optical storage medium.

According to the above embodiment, the width value of the plurality of FE signals includes a width of one, multiple, a half, a quarter, a positive half-cycle, a negative half-cycle, or peak to valley of the FE signals (S curves).

According to the above embodiment, the plurality of electrical signals includes a plurality of optical pickup signals and/or RF signals.

According to the above embodiment, the plurality of push-pull tracking error signal includes at least one of main push-pull (MPP) signals, sub push-pull (SPP) signals, and differential push-pull (DPP) signals.

According to the above embodiment, the optical storage medium includes at least one of compact disc (CD), digital video disc (DVD), and blue-ray disc (BD).

The SA compensation apparatus and method of the present invention mainly include two parts. First, before the optical storage medium has focused on, the width of the FE signals (S curves) is used as the basis for regulating the SA so as to obtain a SA compensation value. At this time, the obtained SA compensation value may be used as a initial compensation value before the playback. Second, after the optical storage medium has focused on, the ratio values of peaks and valleys of upper and lower envelope curves of the RF signals may be used as the basis for further regulating the SA compensation value. The greatest ratio value represents the optimal SA compensation value. When the optical storage medium is empty and does not have RF signals, the peak-to-peak values of the push-pull tracking error signals may be used as the basis for regulating the SA compensation value, thereby ensuring the optimal optical quality no matter the system plays back or burns.

Since the ratio values of peaks and valleys of upper envelope curves to lower envelope curves of RF signals and the peak-to-peak values of the push-pull tracking error signals all reflect the status of the SA of the light point generated by the OPH and focused on the disc, the SA compensation apparatus and method of the present invention can obtain the status of the SA of the light point generated by the OPH and focused on the disc without disposing the photo sensors in the OPH.

In view of the above, the SA compensation apparatus and method of the present invention may further compensate the SA of the light point generated by the OPH and focused on the disc after the OPH has focused on the disc and before the OPH performs the track-pull-in operation, such that the optical storage system of the present invention may provide high playback and burning qualities.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
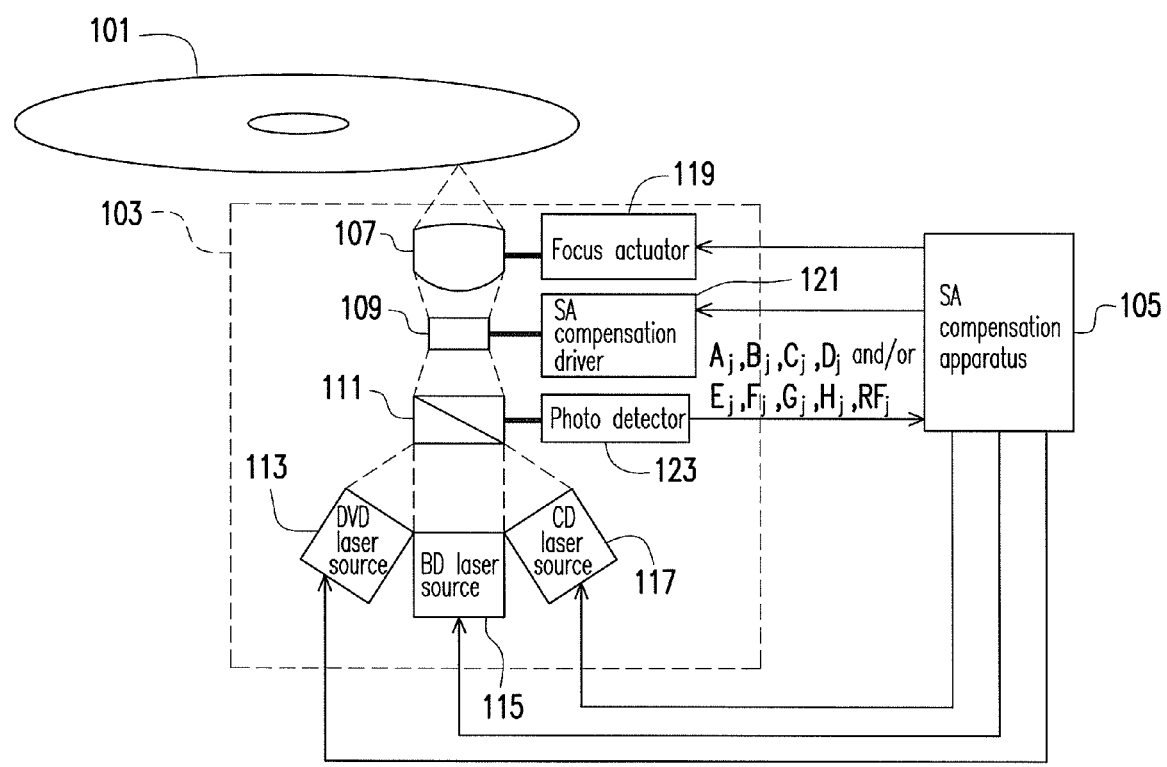
FIG. 1 is a system architectural view of an optical storage system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention is directed to a spherical aberration (SA) compensation apparatus and method, which is capable of correctly compensating SA of the light point generated by an optical-pickup-head (OPH) and focused on the disc, so as to make the optical storage system have better display and burning quality. The technical feature of the present invention is described in detail as follows for persons of ordinary skill in the art.

FIG. 1 is a system architectural view of an optical storage system 100 according to an embodiment of the present invention. Referring to FIG. 1, the optical storage system 100 includes an optical storage medium 101, an optical-pickup-head (OPH) 103, and an SA compensation apparatus 105. The optical storage medium 101 may be, but not limited to, at least one of a compact disc (CD), a digital video disc (DVD), and a blue-ray disc (BD).

The OPH 103 includes an objective lens 107, an SA compensation unit 109, a beam splitter 111, a DVD laser source 113, a BD laser source 115, a CD laser source 117, a focus actuator 119, an SA compensation driver 121, and a photo detector 123. Definitely, the OPH 103 may further include other elements therein, and only the related parts are illustrated in the embodiment.

Figure 2:
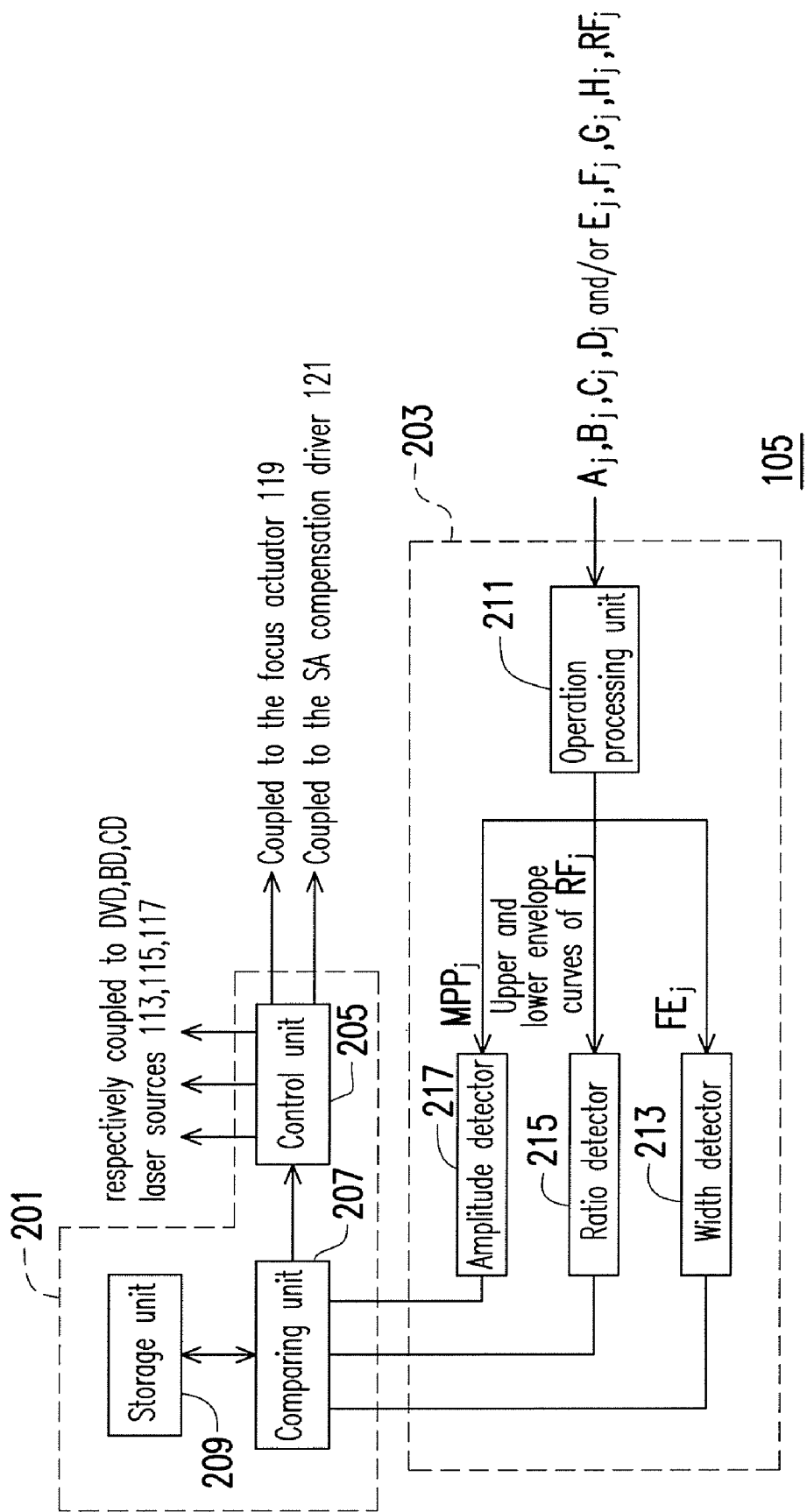
FIG. 2 is an internal block view of an SA compensation apparatus according to an embodiment of the present invention.

FIG. 2 is an internal block view of the SA compensation apparatus 105 according to an embodiment of the present invention. Referring to FIGS. 1 and 2 together, the SA compensation apparatus 105 includes a microprocessor (MPU) 201 and a digital signal processor (DSP) 203. The microprocessor 201 includes a control unit 205, a comparing unit 207, and a storage unit 209. The DSP 203 includes an operation processing unit 211, a width detector 213, a ratio detector 215, and an amplitude detector 217. Definitely, the microprocessor 201 and the DSP 203 may further include other elements therein, and only the related parts are illustrated in the embodiment.

The microprocessor 201 repeatedly regulates a compensation value of the SA compensation driver 121 of the OPH 103 after the microprocessor 201 has determined the type of the optical storage medium 101 and before the OPH 103 has not focused on the optical storage medium 101. The DSP 203 is coupled to the microprocessor 201, for processing a plurality of electrical signals converted through the OPH 103 whenever the microprocessor 201 has regulated a compensation value of the SA compensation driver 121, so as to obtain a plurality of focus error (FE) signals (i.e. S-curve) $FE_j$, where j is a positive integer.

The microprocessor 201 of the embodiment makes the SA compensation driver 121 to drive the SA compensation unit 109 of the OPH 103 according to width values of the plurality of FE signals $FE_j$ obtained by the DSP 203, after the microprocessor 201 has determined the type of the optical storage medium 101 and before the OPH 103 has focused on the optical storage medium 101, so as to compensate the SA of the light point generated by the OPH 103 and focused on the optical storage medium 101.

In this embodiment, the control unit 205 of the microprocessor 201 is responsible for determining the type of the optical storage medium 101, determining whether the optical storage medium 101 stores data, controlling the DVD laser source 113, the BD laser source 115, the CD laser source 117, and the focus actuator 119, and regulating the compensation value of the SA compensation driver 121. The type of the SA compensation unit 109 may be, but not limited to, a liquid crystal structure or a movable collimating lens in this embodiment.

The technical means for the SA compensation apparatus 105 of this embodiment to compensate the SA of the light point generated by the OPH 103 and focused on the optical storage medium 101 after the microprocessor has determined the type of the optical storage medium 101 and before the OPH 103 has focused on the optical storage medium 101.

First, after the control unit 205 has determined the type of the optical storage medium 101 (for example, but not limited to, DVD), the control unit 205 controls the turn on of the DVD laser source 113 accordingly, so as to make the DVD laser source 113 to emit a laser beam that is then projected onto the data layer of the optical storage medium 101 sequentially through the beam splitter 111, the SA compensation unit 109, and the objective lens 107. Then, before the OPH 103 has focused on the optical storage medium 101, the control unit 205 may repeatedly regulate a compensation value of the SA compensation driver 121, so as to find an optimal compensation value to compensate the SA of the light point generated by the OPH 103 and focused on the optical storage medium 101.

In this embodiment, whenever the control unit 205 has regulated a compensation value of the SA compensation driver 121 to make the SA compensation driver 121 to drive the SA compensation unit 109, the control unit 205 controls the focus actuator 119 to make the objective lens 107 move up and down. In this manner, the laser beam projected by the DVD laser source 113 and reflected by the data layer of the optical storage medium 101 may be transmitted to the photo detector 123 through the beam splitter 111, such that the photo detector 123 may convert the received optical signal into a plurality of electrical signals for the DSP 203. Basically, the electrical signals may include four optical pickup signals $A_j$, $B_j$, $C_j$, $D_j$.

The operation processing unit 211 receives and operates the four optical pickup signals $A_j$, $B_j$, $C_j$, $D_j$ converted through the photo detector 123 after the control unit 205 has regulated the compensation value of the SA compensation driver 121 to make the SA compensation driver 121 drive the SA compensation unit 109, so as to obtain a plurality of FE signals $FE_j$. Generally speaking, each FE signal $FE_j$ may be calculated according to the formula $FE_j = (A_j + C_j) - (B_j + D_j)$, where j is a positive integer. The formula is commonly known by persons of ordinary skill in the art of the present invention, and the details will not be described herein again.

The width detector 213 is coupled to the operation processing unit 211, for detecting the width of each FE signal $FE_j$ obtained by the operation processing unit 211, so as to obtain width values of $FE_j$. The comparing unit 207 is coupled to the control unit 205 and the width detector 213, for comparing width values of the $(i+1)^{th}$ FE signal $FE_{(i+1)}$ and the $i^{th}$ FE signal $FE_i$ obtained by the operation processing unit 211, where i is smaller than or equal to j. The storage unit 209 is coupled to the comparing unit 207, for temporarily storing a smaller one of the width values of the $(i+1)^{th}$ FE signal $FE_{(i+1)}$ and the $i^{th}$ FE signal $FE_i$ compared by the comparing unit 207.

Accordingly, the control unit 205 may make the SA compensation driver 121 drive the SA compensation unit 109 according to a compensation value corresponding to the smallest one of the width values of a plurality of FE signals $FE_j$ obtained by the operation processing unit 211 (i.e. the optimal compensation value of the SA compensation driver 121), so as to compensate the SA of the light point generated by the OPH 103 and focused on the optical storage medium 101.

More clearly, it is assumed that the control unit 205 of the embodiment regulates the compensation value of the SA compensation driver 121 three times (it is not limited to the number of times) after the control unit 205 has determined the type of the optical storage medium 101 and before the OPH 103 has focused on the optical storage medium 101. Under this assumption, the control unit 205 regulates the compensation value of the SA compensation driver 121 for the first time to make the SA compensation driver 121 drive the SA compensation unit 109, and the operation processing unit 211 receives and operates four optical pickup signals $A_1$, $B_1$, $C_1$, $D_1$ converted through the photo detector 123, so as to obtain a first FE signal $FE_1$.

Then, the width detector 213 detects the width of the first FE signal $FE_1$, so as to obtain a width value of the first FE signal $FE_1$. However, since the control unit 205 regulates the compensation value of the SA compensation driver 121 for the first time, no object will be compared by the comparing unit 207. Therefore, the storage unit 209 may directly temporarily store the width value of the first FE signal $FE_1$ and the corresponding SA compensation value.

Then, the control unit 205 may regulate the compensation value of the SA compensation driver 121 for the second time to make the SA compensation driver 121 drive the SA compensation unit 109, the operation processing unit 211 may receive and operate four optical pickup signals $A_2$, $B_2$, $C_2$, $D_2$ converted through the photo detector 123, so as to obtain a second FE signal $FE_2$.

After that, the width detector 213 may detect the width of the second FE signal $FE_2$, so as to obtain a width value of the second FE signal $FE_2$. At this time, the comparing unit 207 may compare the width value of the second FE signal $FE_2$ and width value of the first FE signal $FE_1$ temporarily stored in the storage unit 209, so as to temporarily store the smaller one of the width values of the first FE signal $FE_1$ and the second FE signal $FE_2$ and the corresponding SA compensation value in the storage unit 209.

Here, it is assumed that the width value of the second FE signal $FE_2$ is smaller than that of the first FE signal $FE_1$, so the width value of the second FE signal $FE_2$ may replace the width value of the first FE signal $FE_1$ originally temporarily stored in the storage unit 209, that is, at this time, the storage unit 209 may temporarily store the width value of the second FE signal $FE_2$ and the corresponding SA compensation value therein.

Thereafter, after the control unit 205 may regulate the compensation value of the SA compensation driver 121 for the third time to make the SA compensation driver 121 drive SA compensation unit 109, the operation processing unit 211 may receive and operate four optical pickup signals $A_3$, $B_3$, $C_3$, $D_3$ converted through the photo detector 123, so as to obtain a third FE signal $FE_3$.

After that, the width detector 213 may detect the width of the third FE signal $FE_3$, so as to obtain a width value of the third FE signal $FE_3$. At this time, the comparing unit 207 may compare the width value of the third FE signal $FE_3$ and the width value of the second FE signal $FE_2$ temporarily stored in the storage unit 209, so as to temporarily store the smaller one of the width values of the second FE signal $FE_2$ and the third FE signal $FE_3$ and the corresponding SA compensation value in the storage unit 209.

Herein, it is assumed that the width value of the third FE signal $FE_3$ is larger than the width value of the second FE signal $FE_2$, so the storage unit 209 may temporarily store the width value of the second FE signal $FE_2$ and the corresponding SA compensation value therein. In this manner, the control unit 205 may make the SA compensation driver 121 to drive the SA compensation unit 109 according to the compensation value corresponding to the width value of the second FE signal $FE_2$, so as to compensate the SA of the light point generated by the OPH 103 and focused on the optical storage medium 101.

When the optical system generates the SA, the width of the FE signals $FE_j$ may shift, widen, and dither, and the like. Therefore, smaller width values of the FE signals $FE_j$ indicate smaller SA of the light point generated by the OPH 103 and focused on the optical storage medium 101, i.e., more consistent focuses of the near and far axis of the OPH 103 focusing on the optical storage medium 101.

In this manner, the SA compensation apparatus 105 of the embodiment may correctly compensate the SA of the light point generated by the OPH 103 and focused on the optical storage medium 101 through driving the SA compensation unit 109 according to the compensation value corresponding to the smallest one of the width values of the plurality of FE signals $FE_j$ obtained by repeatedly regulating the compensation value of the SA compensation driver 121 after the microprocessor has determined the type of the optical storage medium 101 and before the OPH 103 has focused on the optical storage medium 101. Thus, the optical storage system 100 may possess the optimal playback and burning quality.

In addition, the width values of the FE signals (S curves) include, but not limited to, a width of one, multiple, a half, a quarter, a positive half-cycle, a negative half-cycle, peak to valley of the FE signals and any combination thereof.

According to another embodiment of the present invention, the SA compensation apparatus 105 may further finely compensate the SA of the light point generated by the OPH 103 and focused on the optical storage medium 101 after the OPH 103 has focused on the optical storage medium 101 and before the OPH 103 performs the track-pull-in operation on the optical storage medium 101, so as to ensure the optical storage system 100 has optimal playback and burning qualities.

In this embodiment, after the OPH 103 has focused on the optical storage medium 101 and before the OPH 103 performs the track-pull-in operation on the optical storage medium 101, when the control unit 205 determines that the optical storage medium 101 has data burnt thereon, the control unit 205 repeatedly regulates the compensation value of the SA compensation driver 121 once again, so as to find an optimal compensation value to compensate the SA of the light point generated by the OPH 103 and focused on the optical storage medium 101.

Likewise, whenever the control unit 205 has regulates the compensation value of the SA compensation driver 121 to make the SA compensation driver 121 drive the SA compensation unit 109, the laser beam projected by the DVD laser source 113 and reflected by the data layer of the optical storage medium 101 may be transmitted to the photo detector 123 through the beam splitter 111, such that the photo detector 123 may convert the received optical signal into a plurality of electrical signals for the DSP 203.

Basically, the electrical signals may include four optical pickup signals $A_j$, $B_j$, $C_j$, $D_j$ and a RF signal $RF_j$, where j is a positive integer. The RF signal $RF_j$ will not be generated unless the optical storage medium 101 has data burnt thereon, so the optical storage medium 101 without any data will not generate the RF signal $RF_j$.

The operation processing unit 211 receives and processes the RF signals $RF_j$ converted through the photo detector 123 whenever the control unit 205 has regulated the compensation value of the SA compensation driver 121 to make the SA compensation driver 121 drive the SA compensation unit 109, so as to obtain upper and lower envelope curves of a plurality of radio frequency signals $RF_j$.

The ratio detector 215 is coupled to the operation processing unit 211 and the comparing unit 207, for detecting and obtaining the ratio values of peaks and valleys of upper envelope curves to lower envelope curves of the RF signals $RF_j$ obtained by the operation processing unit 211.

Figure 3:
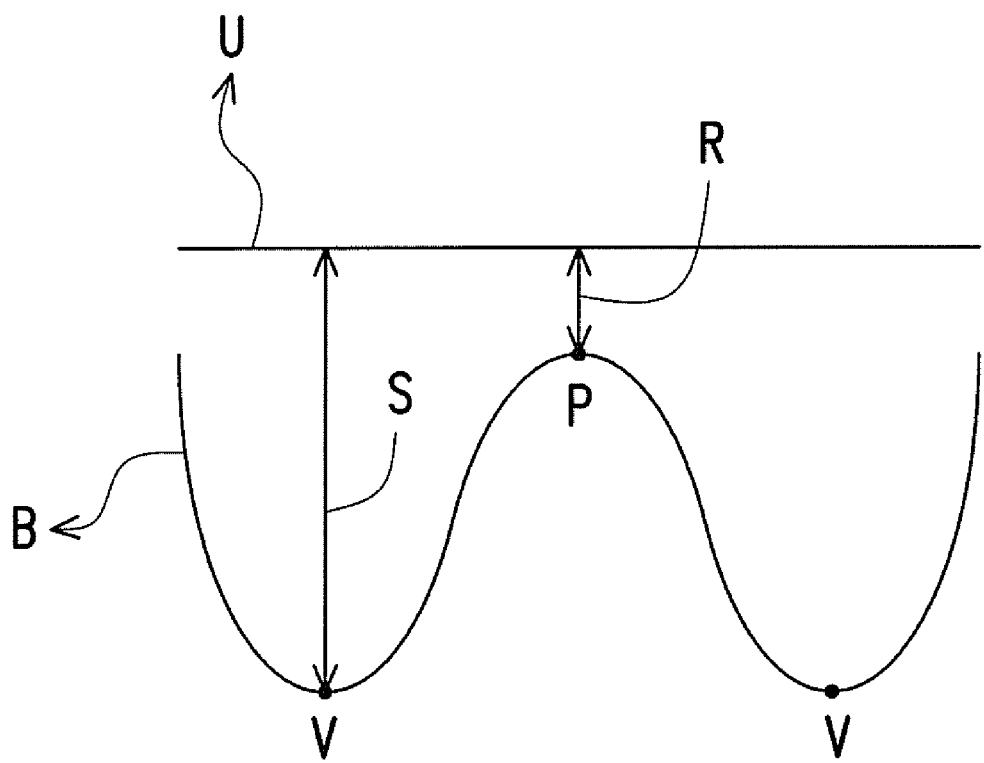
FIG. 3 is a schematic view of an upper and a lower envelope curve of a RF signal according to an embodiment of the present invention.

For example, FIG. 3 is a schematic view of upper and lower envelope curves of RF signals $RF_j$ according to an embodiment of the present invention. Referring to FIG. 3, the mark U in FIG. 3 indicates the upper envelope curves of RF signals $RF_j$, mark B indicates the lower envelope curves of RF signals $RF_j$, mark P indicates peaks of the lower envelope curves of RF signals $RF_j$, and mark V indicates valleys of lower envelope curves of RF signals $RF_j$. It can be clearly seen from FIG. 3 that the ratio values of peaks P and valleys V of the upper envelope curve U and the lower envelope curve B of the RF signals $RF_j$ may be obtained by dividing the length of the line segment R by the length of the line segment S, i.e., R/S (however, the present invention is not limited to this), where S, R are positive integers. Generally speaking, when the optical system generates the SA, the peaks of the lower envelope curves of $RF_j$ signals become small, so the ratio values become small.

The comparing unit 207 is used to compare ratio values of the $(i+1)^{th}$ RF signal $RF_{(i+1)}$ and the $i^{th}$ RF signal $RF_i$ obtained by the operation processing unit 211, where i is smaller than or equal to j. The storage unit 209 temporarily stores the larger one of the ratio values of the $(i+1)^{th}$ RF signal $RF_{(i+1)}$ and $i^{th}$ RF signal $RF_i$ after compared by the comparing unit 207 and the corresponding SA compensation value thereof.

Accordingly, the control unit 205 makes the SA compensation driver 121 to drive the SA compensation unit 109 according to the compensation value corresponding to the larger ratio value of a plurality of RF signal $RF_j$ obtained by the operation processing unit 211 (i.e., the optimal compensation value of the SA compensation driver 121), so as to compensate the SA of the light point generated by the OPH 103 and focused on the optical storage medium 101.

More clearly, it is assumed that after the OPH 103 of the embodiment has focused on the optical storage medium 101 and before the OPH 103 performs the track-pull-in operation on the optical storage medium 101, the control unit 201 determines that the optical storage medium 101 has stored data, the compensation value of the SA compensation driver 121 is regulated three times (it is not limited to this number of times). Under this assumption, after the control unit 205 regulates the compensation value of the SA compensation driver 121 for the first time so as to make the SA compensation driver 121 drive the SA compensation unit 109, the operation processing unit 211 may receive and process the RF signal $RF_1$ converted through the photo detector 123, so as to obtain the upper and lower envelope curves of the first RF signal $RF_1$.

Then, the ratio detector 215 detects ratio of peak and valley of the upper to lower envelope curves of the first RF signal $RF_1$, so as to obtain a ratio value of peak and valley of the upper to lower envelope curves of the first RF signal $RF_1$. However, since the control unit 205 regulates the compensation value of the SA compensation driver 121 for the first time, no objected will be compared by the comparing unit 207. Therefore, the comparing unit 207 may make the storage unit 209 directly temporarily store the first ratio value and the corresponding first SA compensation value therein.

Similar to the above steps, after the SA compensation apparatus regulates the SA for the second time, the ratio value of peak and valley of upper to lower envelope curves of the second RF signal $RF_2$ may be obtained. At this time, the comparing unit 207 may compare the second ratio value and the first ratio value temporarily stored in the storage unit 209, and temporarily stores the larger ratio value and the corresponding SA compensation value in the storage unit 209.

Herein, it is assumed that the second ratio value is larger than the first ratio value, such that the second ratio value and the corresponding second SA compensation value may replace the first ratio value and the first SA compensation value originally temporarily stored in the storage unit 209.

Similarly, the control unit 205 may regulate the SA compensation for the third time, and temporarily store the ratio value of peak and valley of upper to lower envelope curves of the third RF signal $RF_3$ and the corresponding third SA compensation value. Then, similar to the above steps, the comparing unit 207 may compare the third ratio value and the second ratio value temporarily stored in the storage unit 209. If the second ratio value is larger than the third ratio value, the storage unit 209 still stores the second ratio value and the corresponding second SA compensation value, and uses the second compensation value to make the SA compensation driver 121 drive the SA compensation unit 109, so as to compensate the SA of the light point generated by the OPH 103 and focused on the optical storage medium 101.

According to another embodiment of the present invention, when the optical storage medium 101 does not store data, the system will not generate $RF_j$ signals, and meanwhile the photo detector 123 may convert the received optical signal into a plurality of electrical signals for the DSP 203. Basically, the electrical signals may include eight optical pickup signals $A_j, B_j, C_j, D_j, E_j, F_j, G_j, H_j$, where j is a positive integer.

The operation processing unit 211 receives and processes the eight optical pickup signals $A_j, B_j, C_j, D_j, E_j, F_j, G_j, H_j$ converted through the photo detector 123 whenever the control unit 205 has regulated the compensation value of the SA compensation driver 121 so as to make the SA compensation driver 121 drive the SA compensation unit 109, so as to obtain a plurality of push-pull tracking error signals, e.g. at least one of the main push-pull signals $MPP_j$, sub push-pull signals $SPP_j$, and differential push-pull signals $DPP_j$, where j is a positive integer.

Generally speaking, each main push-pull signal $MPP_j$ may be calculated according to the formula $MPP_j=(A_j+D_j)-(B_j+C_j)$, and each sub push-pull signal SPP may be calculated according to the formula $SPP_j=(F_j+G_j)-(E_j+H_j)$, each differential push-pull signal $DPP_j$ may be calculated according to the formula $DPP_j=[(A_j+D_j)-(B_j+C_j)]-[(F_j+G_j)-(E_j+H_j)]$. The formulae are commonly known by persons of ordinary skill in the art of the present invention, and the details will not be described herein again. In this embodiment, the main push-pull signal $MPP_j$ may be taken as an example, but the present invention is not limited to this.

The amplitude detector 217 is coupled to the operation processing unit 211 and the comparing unit 207, for detecting the amplitude of each main push-pull signal $MPP_j$ obtained by the operation processing unit 211, so as to obtain the peak-to-peak value of each main push-pull signal $MPP_j$ obtained by the operation processing unit 211. The comparing unit 207 compares the peak-to-peak values of the $(i+1)^{th}$ main push-pull signals $MPP_{(i+1)}$ and the $i^{th}$ main push-pull signals $MPP_i$ obtained by the operation processing unit 211, where i is smaller than or equal to j. The storage unit 209 temporarily stores the larger one of the peak-to-peak values of the $(i+1)^{th}$ main push-pull signals $MPP_{(i+1)}$ and the $i^{th}$ main push-pull signals $MPP_i$ after those signals are compared by the comparing unit 207.

Since the peak-to-peak value of the main push-pull signals $MPP_j$ becomes smaller when the SA of the light point generated by the OPH 103 and focused on the optical storage medium 101 aggregates. Therefore, the larger peak-to-peak value of the main push-pull signals $MPP_j$ indicates the smaller SA of the light point generated by the OPH 103 and focused on the optical storage medium 101. Accordingly, the control unit 205 makes the SA compensation driver 121 drive the SA compensation unit 109 according to the compensation value corresponding to the larger peak-to-peak value of a plurality of main push-pull signals $MPP_j$ obtained by the operation processing unit 211 (i.e. the optimal compensation value of the SA compensation driver 121), so as to compensate the SA of the light point generated by the OPH 103 and focused on the optical storage medium 101.

More clearly, it is assumed that the control unit 201 of the embodiment determines that the optical storage medium 101 does not store any data after the OPH 103 has focused on the optical storage medium 101 and before the OPH 103 performs the track-pull-in operation on optical storage medium 101, and then regulates the compensation value of the SA compensation driver 121 for three times (it is not limited to this numeral value). Under this assumption, after the control unit 205 regulates the compensation value of the SA compensation driver 121 for the first time so as to make the SA compensation driver 121 drive the SA compensation unit 109, the operation processing unit 211 may receive and process the eight optical pickup signals $A_1, B_1, C_1, D_1, E_1, F_1, G_1, H_1$ converted through the photo detector 123, so as to obtain a first main push-pull signal $MPP_1$.

Then, amplitude detector 217 may detect the amplitude of the first main push-pull signals $MPP_1$, so as to obtain a peak-to-peak value of the first main push-pull signal $MPP_1$. However, since the control unit 205 regulates the compensation value of the SA compensation driver 121 for the first time, no objected will be compared by the comparing unit 207. Therefore, the comparing unit 207 may make the storage unit 209 directly temporarily store the peak-to-peak value of the first main push-pull signal $MPP_1$ and the corresponding SA compensation value therein.

Then, the control unit 205 regulates the compensation value of the SA compensation driver 121 for the second time so as to make the SA compensation driver 121 drive the SA compensation unit 109, the operation processing unit 211 receives and operates eight optical pickup signals $A_2, B_2, C_2, D_2, E_2, F_2, G_2, H_2$ converted through the photo detector 123, so as to obtain a second main push-pull signal $MPP_2$.

After that, the amplitude detector 217 detects the amplitude of the second main push-pull signal $MPP_2$, so as to obtain a peak-to-peak value of the second main push-pull signal $MPP_2$. At this time, the comparing unit 207 may compare the peak-to-peak value of the second main push-pull signal $MPP_2$ and the peak-to-peak value of the first main push-pull signal $MPP_1$ temporarily stored in the storage unit 209, and temporarily stores the larger peak-to-peak value and the corresponding SA compensation value in the storage unit 209. Herein, it is assumed that the peak-to-peak value of the second main push-pull signal $MPP_2$ is smaller than the peak-to-peak value of the first main push-pull signal $MPP_1$, so the storage unit 209 may temporarily store the peak-to-peak value of the first main push-pull signal $MPP_1$ and the corresponding first SA compensation value therein. Similarly, the system may regulate the SA for the third time, and obtain a third main push-pull signal $MPP_3$. Then, the comparing unit 207 may compare the peak-to-peak value of the third main push-pull signal $MPP_3$ and the peak-to-peak value of the first main push-pull signal $MPP_1$ temporarily stored in the storage unit 209. If the peak-to-peak value of the third main push-pull signal $MPP_3$ is smaller than the peak-to-peak value of the first main push-pull signal $MPP_1$, the storage unit 209 may temporarily store the peak-to-peak value of the first main push-pull signal $MPP_1$ and the corresponding first SA compensation value therein. In this manner, the control unit 205 may make the SA compensation driver 121 drive the SA compensation unit 109 according to the compensation value corresponding to the peak-to-peak value of the first main push-pull signal $MPP_1$, so as to compensate the SA of the light point generated by the OPH 103 and focused on the optical storage medium 101.

In other embodiments of the present invention, the SA compensation apparatus 105 may finely compensate the SA of the light point generated by the OPH 103 and focused on the optical storage medium 101 through driving the SA compensation unit 109 as long as it is determined that the optical storage medium 101 does not store data according to the compensation value corresponding to the larger one of the peak-to-peak values of a plurality of sub push-pull signals $SPP_j$ or differential push-pull signals $DPP_j$ obtained by repeatedly regulating the compensation value of the SA compensation driver 121 after the OPH 103 has focused on the optical storage medium 101 and before the OPH 103 performs the track-pull-in operation optical on the storage medium 101. The variations of implementation fall within the scope of the present invention.

The present invention further provides an SA compensation method.

Figure 4:
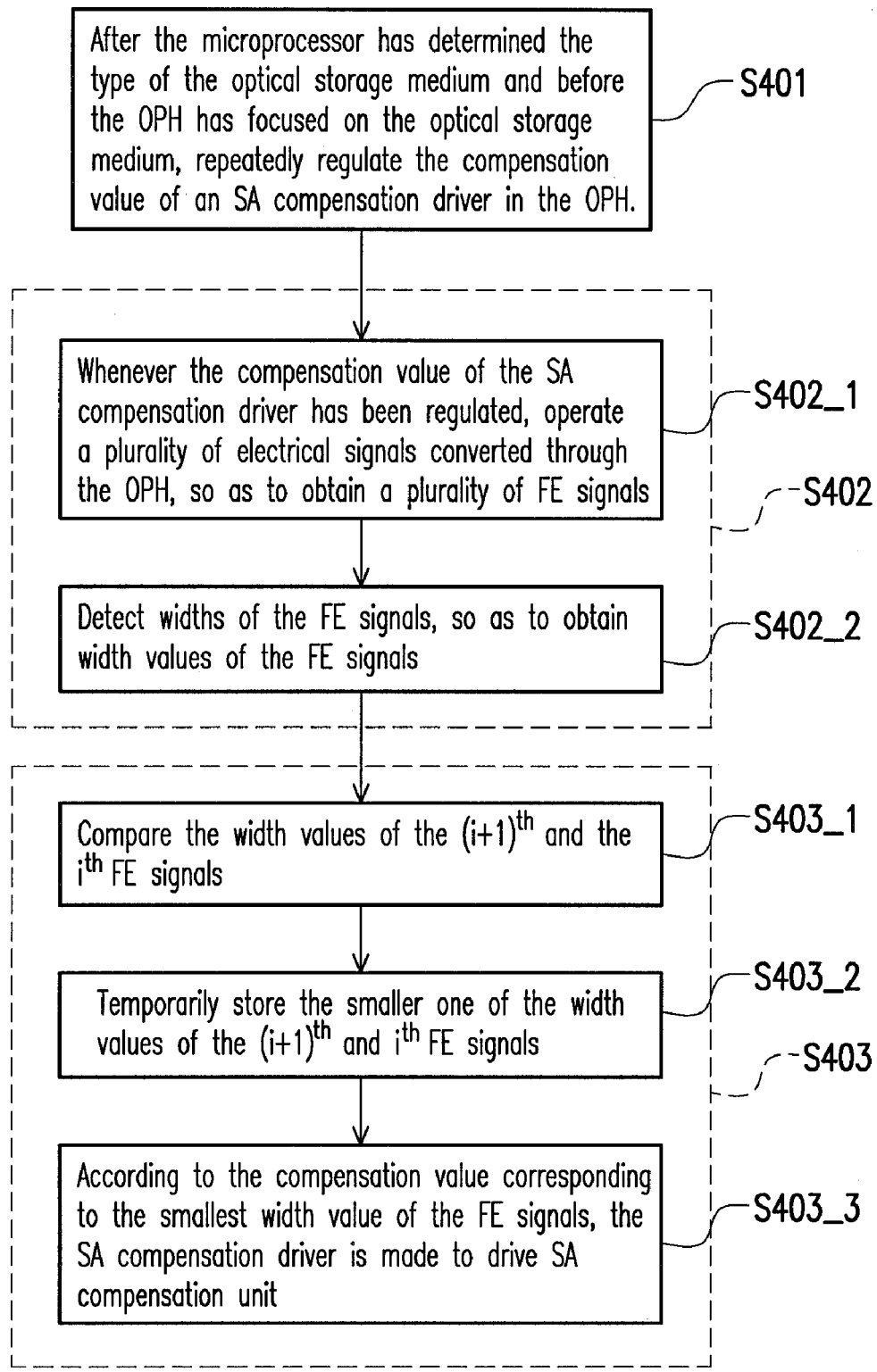
FIG. 4 is a schematic view of processes of an SA compensation method according to an embodiment of the present invention.

FIG. 4 is a schematic view of processes of an SA compensation method according to an embodiment of the present invention. Referring to FIG. 4, the SA compensation method of the embodiment includes the following steps. First, in step S401, after the type of the optical storage medium is determined and before the OPH has focused on the optical storage medium, the compensation value of an SA compensation driver in the OPH is repeatedly regulated.

Then, in step S402, whenever the compensation value of the SA compensation driver has been regulated, a plurality of electrical signals converted through the OPH (normally four optical pickup signals A, B, C, D) is processed, so as to obtain width values of a plurality of FE signals. In this embodiment, each FE signal may be calculated according to the formula FE=(A+C)−(B+D). The formula is commonly known by persons of ordinary skill in the art of the present invention, and the details will not be described herein again.

Furthermore, in step S402, the step that a plurality of electrical signals converted through the OPH is processed to obtain the width values of a plurality of FE signals includes whenever the compensation value of the SA compensation driver has been regulated, operating the plurality of electrical signals converted through the OPH, so as to obtain the plurality of FE signals (step S402_1). Then, the widths of the FE signals are detected, so as to obtain the width values of the FE signals (step S402_2). In this embodiment, the width values of the FE signals may be a width of one, multiple, a half, a quarter, a positive half-cycle, a negative half-cycle, peak to valley of the FE signals (S curves) and any combination thereof.

Finally, in step S403, the SA compensation driver is made to drive the SA compensation unit of the OPH (for example, but not limited to, the SA compensation unit of the liquid crystal structure type or the SA compensation unit of the movable collimating lens type) according to the width values of the FE signals, so as to compensation SA of the light point generated by the OPH and focused on the optical storage medium.

In step S403, the step that the SA compensation driver is made to drive an SA compensation unit in the OPH according to the width values of the FE signals includes comparing width values of the $(i+1)^{th}$ and the $i^{th}$ FE signals, where i is a positive integer (step S403_1). Then, the smaller one of the width values of the $(i+1)^{th}$ and $i^{th}$ FE signals is temporarily stored (step S403_2). After that, the compensation value corresponding to the smaller width value of the FE signals is utilized to make the SA compensation driver to drive the SA compensation unit (step S403_3).

However, according to the spirit of the present invention, in addition to compensate the SA of the light point generated by the OPH and focused on the optical storage medium after the microprocessor has determined the type of the optical storage medium and before the OPH has focused on the optical storage medium, the SA compensation method may further finely compensate the SA of the light point generated by the OPH and focused on the optical storage medium after the OPH has focused on the optical storage medium and before the OPH performs the track-pull-in operation on the optical storage medium, so as to ensure the optical storage system 100 has optimal playback and burning qualities.

However, the present invention is not limited to this according to the spirit of the present application. That is to say, in other embodiments of the present invention, the SA compensation method includes compensating the SA of the light point generated by the OPH and focused on the optical storage medium after the microprocessor has determined the type of the optical storage medium and before the OPH has focused on the optical storage medium, or compensate the SA of the light point generated by the OPH and focused on the optical storage medium after the OPH has focused on the optical storage medium and before the OPH performs the track-pull-in operation on the optical storage medium. The variations of implementation fall within the scope of the present invention.

Figure 5:
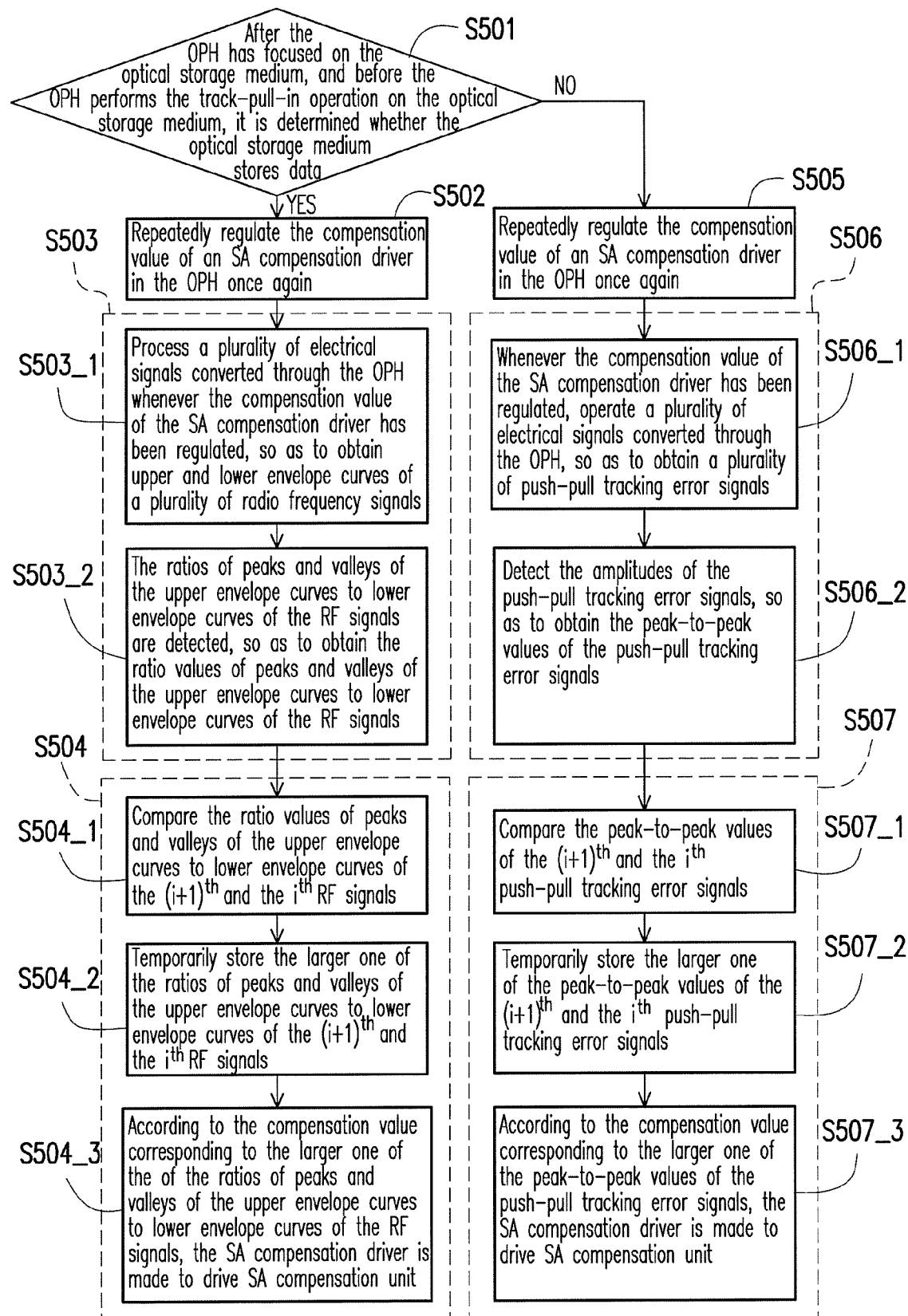
FIG. 5 is a schematic view of processes of an SA compensation method according to another embodiment of the present invention.

Accordingly, FIG. 5 is a schematic view of processes of the SA compensation method according to another embodiment of the present invention. Referring to FIG. 5, the SA compensation method of the embodiment includes the following steps. First, in step S501, after the OPH has focused on the optical storage medium, and before the OPH performs the track-pull-in operation on the optical storage medium, it is determined whether the optical storage medium stores data.

When it is determined that optical storage medium stores data, the SA compensation method of the embodiment includes repeatedly regulating the compensation value of an SA compensation driver in the OPH once again in step S502. Then, in step S503, whenever the compensation value of the SA compensation driver has been regulated, a plurality of electrical signals converted through the OPH (normally four optical pickup signals A, B, C, D and a RF signal RF) are processed, so as to obtain ratio values of peaks and valleys of upper envelope curves to lower envelope curves of a plurality of RF signals.

In step S503, the step that a plurality of electrical signals converted through the OPH is processed, so as to obtain the ratio values of peaks and valleys of upper envelope curves to lower envelope curves of a plurality of RF signals includes processing the plurality of electrical signals converted through the OPH whenever the compensation value of the SA compensation driver has been regulated, so as to obtain upper and lower envelope curves of a plurality of RF signals (step S503_1). Then, the ratios of peaks and valleys of the upper envelope curves to lower envelope curves of the RF signals are detected, so as to obtain the ratio values of peaks and valleys of the upper envelope curves to lower envelope curves of the RF signals (step S503_2).

Finally, in step S504, according to the ratio values of peaks and valleys of upper envelope curves to lower envelope curves of the RF signals, the SA compensation driver is made to drive the SA compensation unit of the OPH, so as to compensate the SA of the light point generated by the OPH and focused on the optical storage medium.

In step S504, the step that the SA compensation driver is made to drive an SA compensation unit in the OPH according to the ratio values of peaks and valleys of the upper envelope curves to lower envelope curves of the RF signals includes comparing the ratio values of peaks and valleys of the upper envelope curves to lower envelope curves of the $(i+1)^{th}$ and the $i^{th}$ RF signals, where i is a positive integer (step S504_1). Then, the larger one of the ratio values of peaks and valleys of the upper envelope curves to lower envelope curves of the $(i+1)^{th}$ and the $i^{th}$ RF signals is temporarily stored (step S504_2). After that, according to the compensation value corresponding to the larger one of the of the ratio values of peaks and valleys of the upper envelope curves to lower envelope curves of the RF signals, the SA compensation driver is made to drive the SA compensation unit (step S504_3).

However, when it is determined that the optical storage medium does not store data, the SA compensation method of the embodiment includes repeatedly regulating the compensation value of an SA compensation driver in the OPH once again in step S505. Then, in step S506, whenever the compensation value of an SA compensation driver has been regulated, a plurality of electrical signals converted through the OPH (normally eight optical pickup signals A, B, C, D, E, F, G, H) is processed, so as to obtain peak-to-peak values of a plurality of push-pull tracking error signals.

In this embodiment, the push-pull tracking error signals may be at least one of the main push-pull (MPP) signals, sub push-pull (SPP) signals, and differential push-pull (DPP) signals. Each main push-pull signals MPP may be calculated according to the formula MPP=(A+D)−(B+C), each sub push-pull signals SPP may be calculated according to the formula SPP=(F+G)−(E+H), and each differential push-pull signals DPP may be calculated according to the formula DPP=[(A+D)−(B+C)]−[(F+G)−(E+H)]. The formulae are commonly known by persons of ordinary skill in the art of the present invention, and the details will not be described herein again.

Further, in step S506, the step that a plurality of electrical signals converted through the OPH are processed, so as to obtain peak-to-peak values of a plurality of push-pull tracking error signals includes whenever the compensation value of the SA compensation driver has been regulated, the plurality of electrical signals converted through the OPH are operated, so as to obtain the plurality of push-pull tracking error signals (step S506_1). Then, the amplitudes of the push-pull tracking error signals are detected, so as to obtain the peak-to-peak values of the push-pull tracking error signals (step S506_2).

Finally, in step S507, according to the peak-to-peak values of the push-pull tracking error signals, the SA compensation driver is made to drive the SA compensation unit of the OPH, so as to compensate the SA of the light point generated by the OPH and focused on the optical storage medium.

In step S507, the step that the SA compensation driver is made to drive the SA compensation unit in the OPH according to the peak-to-peak values of the push-pull tracking error signals includes comparing the peak-to-peak values of the $(i+1)^{th}$ and the $i^{th}$ push-pull tracking error signals, where i is a positive integer (step S507_1). Then, the larger one of the peak-to-peak values of the $(i+1)^{th}$ and the $i^{th}$ push-pull tracking error signals is temporarily stored (step S507_2). After that, according to the compensation value corresponding to the larger one of the peak-to-peak values of the push-pull tracking error signals, the SA compensation driver is made to drive SA compensation unit.

In view of the above, the SA compensation apparatus and method of the present invention can regulate the SA according to the width values of a plurality of FE signals obtained by repeatedly regulating a compensation value of an SA compensation driver in the OPH before focusing on the disc, and select the SA compensation value corresponding to the smaller width value as the initial compensation value at the beginning of the playback of the disc. After focusing, the ratio values of peaks and valleys of the upper envelope curves to lower envelope curves of the RF signals or the peak-to-peak values of the push-pull tracking error signals are used as the basis for determining whether the set SA compensation value is the optimal compensation value. The SA compensation value corresponding to the largest one of the ratio values of peaks and valleys of the upper envelope curves to lower envelope curves of the RF signals is selected to serve as the optimal compensation value of the optical system.

To sum up, the SA compensation apparatus and method of the present invention may further compensate the SA of the light point generated by the OPH and focused on the disc after the OPH has focused on the disc, and before the OPH performs the track-pull-in operation. Furthermore, the optical storage system of the present invention may possess better playback and burning qualities at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A spherical aberration (SA) compensation apparatus of an optical storage system, comprising:
   a microprocessor, for repeatedly regulating a compensation value of an SA compensation driver in an optical-pickup-head (OPH) after determining a type of an optical storage medium and before the OPH has focused on the optical storage medium; and
   a digital signal processor (DSP), coupled to the microprocessor, for processing a plurality of electrical signals converted through the OPH when each time the compensation value has been regulated, so as to obtain width values of a plurality of focus error (FE) signals,
   wherein the microprocessor makes the SA compensation driver to drive an SA compensation unit in the OPH according to the width values of the FE signals, so as to compensate an SA of a light point generated by the OPH and focused on an optical storage medium.

2. The apparatus according to claim 1, wherein the microprocessor comprises:
  a control unit, coupled to the SA compensation driver and the OPH, for determining the type of the optical storage medium and whether the optical storage medium has data stored thereon, and repeatedly regulating the compensation value.

3. The apparatus according to claim 2, wherein the DSP comprises:
  an operation processing unit, coupled to the OPH, for receiving and operating the electrical signals converted through the OPH after the control unit has regulated the compensation value, so as to obtain the FE signals; and
  a width detector, coupled to the operation processing unit, for detecting widths of the FE signals, so as to obtain the width values of the FE signals.

4. The apparatus according to claim 3, wherein the width values of the FE signals include a width of one, multiple, a half, a quarter, a positive half-cycle, a negative half-cycle, peak to valley of the FE signals and any combination thereof.

5. The apparatus according to claim 3, wherein the microprocessor further comprises:
  a comparing unit, coupled to the control unit and the width detector, for comparing width values of $(i+1)^{th}$ and $i^{th}$ FE signals, where i is a positive integer; and
  a storage unit, coupled to the comparing unit, for temporarily storing a smallest one of the width values of the $(i+1)^{th}$ and $i^{th}$ FE signals, and a compensation value corresponding to the smaller width value.

6. The apparatus according to claim 5, wherein the control unit makes the SA compensation driver to drive an SA compensation unit within the OPH according to the compensation value with a smallest width value.

7. The SA compensation apparatus according to claim 6, wherein the control unit further determines whether the optical storage medium has data stored thereon, and repeatedly regulates the compensation value once again after the OPH has focused on the optical storage medium and before the OPH performs a track-pull-in operation on the optical storage medium.

8. The apparatus according to claim 7, wherein when the optical storage medium stores data, the operation processing unit receives and processes a plurality of electrical signals converted through the OPH after each time the control unit has regulated the compensation value, so as to obtain upper and lower envelope curves of a plurality of radio frequency (RF) signals after regulating repeatedly.

9. The apparatus according to claim 8, wherein the DSP further comprises:
  a ratio detector, coupled to the operation processing unit and the comparing unit, for detecting ratios of peaks and valleys of upper envelope curves to lower envelope curves of the RF signals, so as to obtain ratio values of peaks and valleys of upper envelope curves to lower envelope curves of the RF signals.

10. The apparatus according to claim 9, wherein the comparing unit further compares ratio values of peaks and valleys of upper envelope curves to lower envelope curves of the $(i+1)^{th}$ and $i^{th}$ RF signals, and the storage unit stores a larger ratio and a compensation value corresponding to the larger ratio value.

11. The apparatus according to claim 10, wherein the control unit makes the SA compensation driver to drive the SA compensation unit according to the compensation value corresponding to the larger ratio value.

12. The apparatus according to claim 7, wherein when the optical storage medium does not store data, the operation processing unit receives and operates the plurality of electrical signals converted through the OPH after the control unit has regulated the compensation value, so as to obtain a plurality of push-pull tracking error signals by regulating repeatedly.

13. The apparatus according to claim 12, wherein the push-pull tracking error signals include at least one of main push-pull (MPP) signals, sub push-pull (SPP) signals, and differential push-pull (DPP) signals.

14. The apparatus according to claim 12, wherein the DSP further comprises:
  an amplitude detector, coupled to the operation processing unit and the comparing unit, for detecting amplitudes of the push-pull tracking error signals, so as to obtain peak-to-peak values of the push-pull tracking error signals.

15. The apparatus according to claim 14, wherein the comparing unit compares peak-to-peak values of $(i+1)^{th}$ and $i^{th}$ push-pull tracking error signals, and the storage unit temporarily stores a largest peak-to-peak value and a compensation value corresponding to the larger peak-to-peak value.

16. The apparatus according to claim 15, wherein the control unit makes the SA compensation driver to drive the SA compensation unit according to the compensation value corresponding to the largest peak-to-peak value of the push-pull tracking error signals.

17. The apparatus according to claim 1, wherein the optical storage medium includes at least one of a compact disc, a digital video disc, and a blue-ray disc.

18. A spherical aberration (SA) compensation method, comprising:
  regulating repeatedly a compensation value of an SA compensation driver in an optical-pickup-head after determining a type of an optical storage medium, and before the OPH has focused on the optical storage medium;
  processing a plurality of electrical signals converted through the OPH when each time the compensation value has been regulated, so as to obtain a plurality of focus error (FE) signals;
  detecting widths of FE signals, so as to obtain width values of the FE signals; and
  making the SA compensation driver to drive an SA compensation unit in the OPH according to the width values of the FE signals, so as to compensate an SA of a light point generated by the OPH and focused on the optical storage medium.

19. The method according to claim 18, wherein the width values of the FE signals include a width of one, multiple, a half, a quarter, a positive half-cycle, a negative half-cycle, peak to valley of the FE signals and any combination thereof.

20. The method according to claim 19, wherein the process of driving the SA compensation unit according to the width values of the FE signals comprises:
  comparing width values of $(i+1)^{th}$ and $i^{th}$ FE signals, wherein i is a positive integer;
  temporarily storing a smallest one of the width values of the $(i+1)^{th}$ and $i^{th}$ FE signals; and
  making the SA compensation driver to drive the SA compensation unit according to the compensation value corresponding to the smallest width value.

21. The method according to claim 18, further comprising:
  determining whether the optical storage medium has data stored thereon after the OPH has focused on the optical storage medium and before the OPH performs a track-pull-in operation on the optical storage medium.

22. The method according to claim 21, after determining that the optical storage medium has stored data, further comprising:

regulating repeatedly the compensation value of the SA compensation driver in the OPH once again;

processing a plurality of electrical signals converted through the OPH when each time the compensation value has been regulated, so as to obtain a plurality of radio frequency (RF) signals;

detecting ratios of peaks and valleys of upper envelope curves to lower envelope curves of the RF signals, so as to obtain ratio values of peaks and valleys of the upper envelope curves to the lower envelope curves of the RF signals; and making the SA compensation driver to drive the SA compensation unit in the OPH according to the ratio value, so as to compensate the SA of the light point generated by the OPH and focused on the optical storage medium.

23. The method according to claim 22, wherein the process of driving the SA compensation unit according to the ratio value comprises:

comparing ratio values of peaks and valleys of the upper envelope curves to the lower envelope curves of the $(i+1)^{th}$ and a RF signals;

temporarily storing a largest one of the ratio values of peaks and valleys of the upper envelope curves to the lower envelope curves of the $(i+1)^{th}$ and a RF signals; and making the SA compensation driver to drive the SA compensation unit according to the compensation value corresponding to the largest ratio value.

24. The method according to claim 21, after determining that the optical storage medium has not stored data, further comprising:

repeatedly regulating the compensation value of the SA compensation driver in the OPH once again;

processing a plurality of electrical signals converted through the OPH when each time the compensation value has been regulated, so as to obtain a plurality of push-pull tracking error signals;

detecting amplitudes of the push-pull tracking error signals, so as to obtain peak-to-peak values of the push-pull tracking error signals; and making the SA compensation driver to drive the SA compensation unit in the OPH according to the peak-to-peak values of the push-pull tracking error signals, so as to compensate the SA of the light point generated by the OPH and focused on the optical storage medium.

25. The method according to claim 24, wherein the process of driving the SA compensation unit according to the peak-to-peak values of the push-pull tracking error signals comprises:

comparing peak-to-peak values of the $(i+1)^{th}$ and $i^{th}$ push-pull tracking error signals;

temporarily storing a largest one of the peak-to-peak values of the $(i+1)^{th}$ and $i^{th}$ push-pull tracking error signals; and making the SA compensation driver to drive the SA compensation unit according to the compensation value corresponding to the largest peak-to-peak value.

* * * * *